United States Patent [19]

Sirois et al.

[11] Patent Number: 4,590,969
[45] Date of Patent: May 27, 1986

[54] VALVE

[75] Inventors: Herbert J. Sirois, Niantic; Kenneth A. Wheeler, N. Granby, both of Conn.

[73] Assignee: Terry Corporation of Connecticut, Windsor, Conn.

[21] Appl. No.: 717,052

[22] Filed: Mar. 28, 1985

[51] Int. Cl.[4] .......... F16K 11/20; F16K 31/44
[52] U.S. Cl. ............... 137/637.2; 137/613; 251/229; 251/319; 251/279
[58] Field of Search .......... 737/613, 614.19; 137/637.2; 251/229, 231, 318, 319, 279

[56] References Cited

U.S. PATENT DOCUMENTS

| | | | |
|---|---|---|---|
| 854,108 | 5/1907 | Reynolds | 137/614.19 |
| 987,801 | 3/1911 | Greuter | 137/637.2 |
| 1,996,291 | 4/1935 | Haas | 137/614.19 |
| 3,529,630 | 9/1970 | Podolsky | 137/637.2 |
| 3,970,110 | 7/1976 | Schaedler et al. | 137/637.2 |

FOREIGN PATENT DOCUMENTS 94426  6/1960  Netherlands ............ 137/637.2

Primary Examiner—G. L. Walton
Attorney, Agent, or Firm—Bernard J. Murphy

[57] ABSTRACT

In an embodiment of the invention, the valve comprises an apertured valve seat toward and from which a valving element is movably disposed, for occluding and exposing the aperture in the valve seat to fluid flow. An actuating rod is coupled to the valving element and is movable along an axis for effecting movement of the element relative to the seat, and supporting structure is provided to support the actuating rod for its axial movement. However, the supporting structure, too, is movable along the aforesaid axis. Consequently, axial movement of the supporting structure reduces the possibility that, when the actuating rod must be moved, to effect movement of the valving element, it will be found to be stuck (i.e., "frozen") due to contamination, accretion of particulate matter, etc.

1 Claim, 6 Drawing Figures

VALVE

This invention pertains to valves, and in particular to valves useful for controlling fluid flow through apertured valve seats and having valving elements, movable relative to such valves seats, for occluding and exposing the apertures therein, to prohibit and to accommodate such fluid flow.

Valves of the aforesaid type are well known in the prior art and, typically, they comprise valving elements which are movable by means of a rod-actuator fixed thereto which, in turn, is slidably supported in a rigid structure.

Such prior art valves, if frequently operated, normally experience no operational difficulties. However, if such valves are infrequently operated, and particularly if they are employed in other than clean environments, it will be found that the rod-actuator can become "frozen", so that the associated valving element can not be moved. Instead of the rod-actuator being slidable in its rigid support structure, it becomes stuck therein, due to contamination, crystalline noncondensables, accretion of particulate matter, or the like.

It is an object of this invention to set forth a novel valve in which the aforecited disadvantage is minimized, if not wholly avoided. Particularly, it is an object of this invention to set forth a valve, comprising means defining a valve seat; said seat having an aperture formed therein for accommodating fluid flow therethrough; a valving element, for movement toward and away from said seat for occluding and opening said aperture to such fluid flow; a rod-actuator, coupled to said element, and movable along an axis, for moving said element toward and away from said seat; and means supporting said rod-actuator for movement along said axis; wherein said supporting means is translatable along said axis.

Further objects of this invention, as well as the novel features thereof, will become more apparent, by reference to the following description, taken in conjunction with the accompanying figures, in which.

Figure 3:
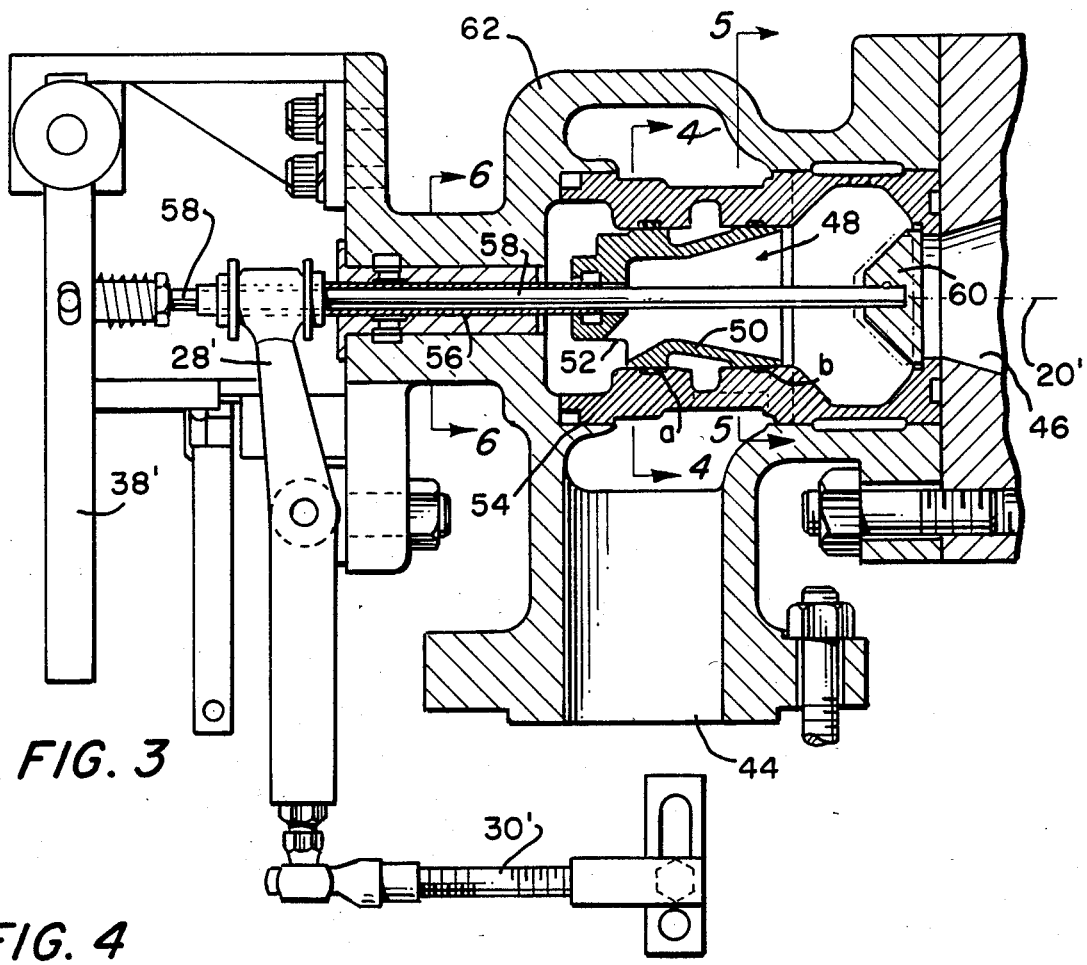
Figure 4:
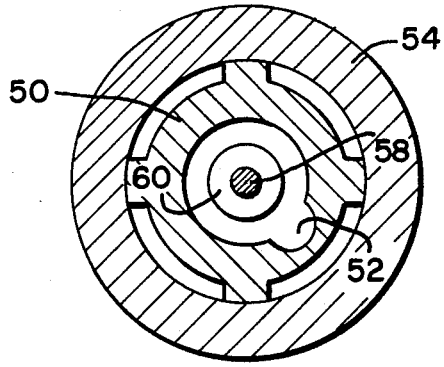
Figure 5:
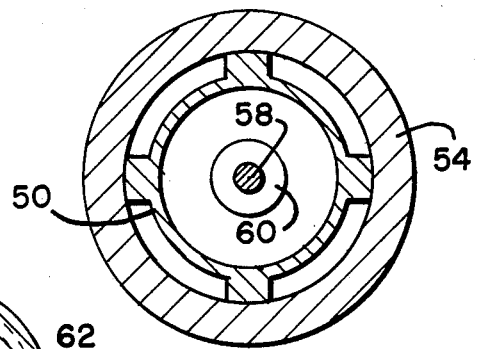
Figure 6:
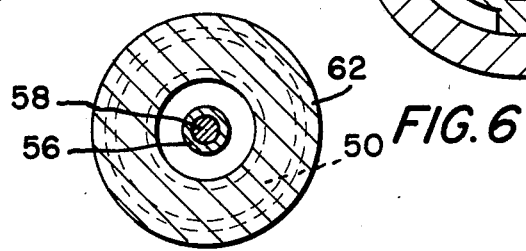

FIG. 3 is an illustration, also partly in cross-section, depicting yet another embodiment of the invention comprising a steam turbine governor valve and a trip valve for the aforesaid steam turbine; and FIGS. 4, 5 and 6 are cross-sections taken along sections 4—4, 5—5, and 6—6 of FIG. 3, respectively.

Figure 1:
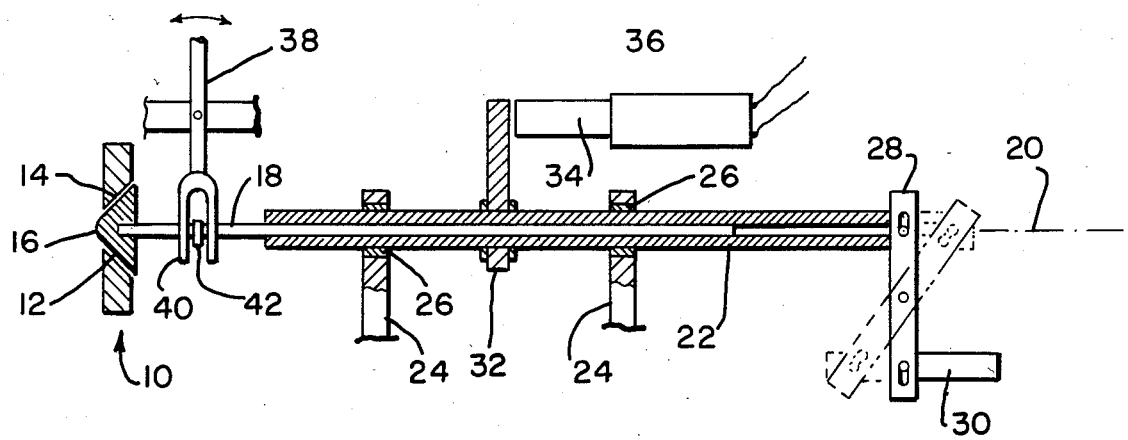
FIG. 1 is an illustration, partly in cross-section, showing a first embodiment of a valve according to the invention.

As shown in FIG. 1, a valve 10 comprises a valve seat 12, having an aperture 14 formed therein for admitting fluid therethrough, and having a valving element 16 movable toward and away from the seat 12 to occlude and expose the aperture 14. A rod-actuator 18 is coupled to the element 16 and is movable along an axis 20 to remove the valving element 16 from the seat 12. Rod-actuator 18 is supported for axial translation in a hollow rod 22, and the latter is also axially movable in rigid supports 24 and 24'. Supports 24 and 24' have bushings 26 therewithin to facilitate the axial movement of a rod 22. Linkages 28 and 30, pivotably coupled to the right-hand (as viewed in FIG. 1) end of rod 22, are manipulatable to cause translation of rod 22. Just what purpose would be served by translation of rod 22 is quite academic. It may carry a limb 32 which, upon movement of rod 22 to the right, engages and strokes a plunger 34 of a switch 36. What is material is this: that rod 22, whatever its end purpose, is frequently moved, whereas the rod-actuator 18 is infrequently moved.

If rod-actuator 18 were to be mounted in some fixed supports, even with intervening bushings, and particularly if the arrangement happened to be in an unclean environment, likely the rod-actuator would become stuck (i.e., "frozen") due to contamination, crystalline noncondensables, accretion of particulate matter, etc.

According to our invention, as exemplified in FIG. 1, the support for the rod-actuator 18—i.e., the hollow rod 22—is itself movable along the same axis 20. Consequently, the possibility of the rod-actuator 18 becoming stuck in the rod 22 is virtually non-existent. When it shall be necessary to operate valve 10, i.e., to open or close valve 10, the pivotably mounted lever 38 may be moved so that its yoke 40, set astride an abutment 42 carried by the rod-actuator 18, will withdraw the element 16 from the aperture 14 (or move the element 6 into closure of the aperture 14, as the circumstances may warrant).

Figure 2:
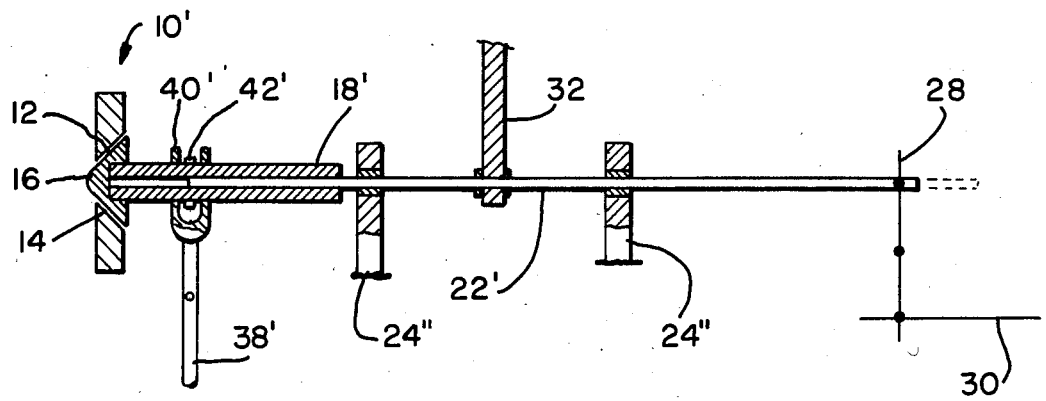
FIG. 2 is an illustration similar to FIG. 1 showing a second embodiment of a valve according to the invention.

As disclosed in FIG. 1, the rod-actuator 18 is slidably received in the hollow rod 22. Now, clearly, the opposite arrangement could be provided, and FIG. 2 is an illustration thereof. In FIG. 2, same or similar index numbers as are in FIG. 1 denote same or similar elements and/or components as in FIG. 1.

In FIG. 2, the rod-actuator 18' is hollow and is slidably in recept of rod 22'. Again, it will be appreciated that, with frequent operation of rod 22', i.e., its recurring translation, rod-actuator 18' will have little opportunity to become frozen stuck thereon.

FIGS. 3–6 depict an application of the invention to an arrangement in which both a steam turbine governor valve and the turbine's trip valve is cooperatively conjoined. As shown, a steam inlet 44 admits steam to the aforesaid valves, and a stam outlet 46 permits steam to pass on to a turbine (not shown). The governor valve 48 comprises a generally bell-shaped valving element 50. Element 50 has an opening 52 formed therein through which to pass steam when element 50 is moved to the left (in FIG. 3) to open seals "a" and "b" formed between lands on element 50 and ridges formed in housing structure 54. The hollow rod 56 is coupled to element 50 and translates along an axis 20' to modulate the opening of the governor valve 48. Linkages 28' and 30' manipulate the rod 56. Slidably supported within rod 56 is an actuator-rod 58 which is coupled to, and operative of, the trip valve 60. In normal operation, the governor valve 48 operates almost or substantially continuously. Such recurring translation of the rod 56, therefor, insures that actuator-rod 58 will be free to move when and as required. A lever 38', pivotably mounted to the housing 62, is coupled to the actuator-rod 58 to accommodate for manipulation of the valve 60.

While we have described out invention in connection with specific embodiments thereof, it is to be clearly understood that this is done only by way of example, and not as a limitation to the scope of our invention as set forth in the objects thereof and in the appended claims.

We claim:

1. In a steam turbine, a valving arrangement, comprising:
   a valve housing;

means defining a valve seat within said housing;
said seat having an aperture formed therein for accommodating steam flow therethrough;
a trip valve valving element, movable toward and away from said seat for occluding and opening said aperture to such steam flow;
a rod-actuator, coupled to said element, and movable along an axis, for moving said element toward and away from said seat; and
means supporting said rod-actuator for movement along said axis; wherein
said supporting means is translatable along said axis and its movement is limited by said trip valve rod-actuator;
said supporting means comprises another rod-actuator that supportingly receives said trip valve rod-actuator therein and coupled to a governor valve valving element movable toward and away from another apertured valve seat within said housing, for controlling steam flow through said another valve seat.

* * * * *